Patented Jan. 4, 1938

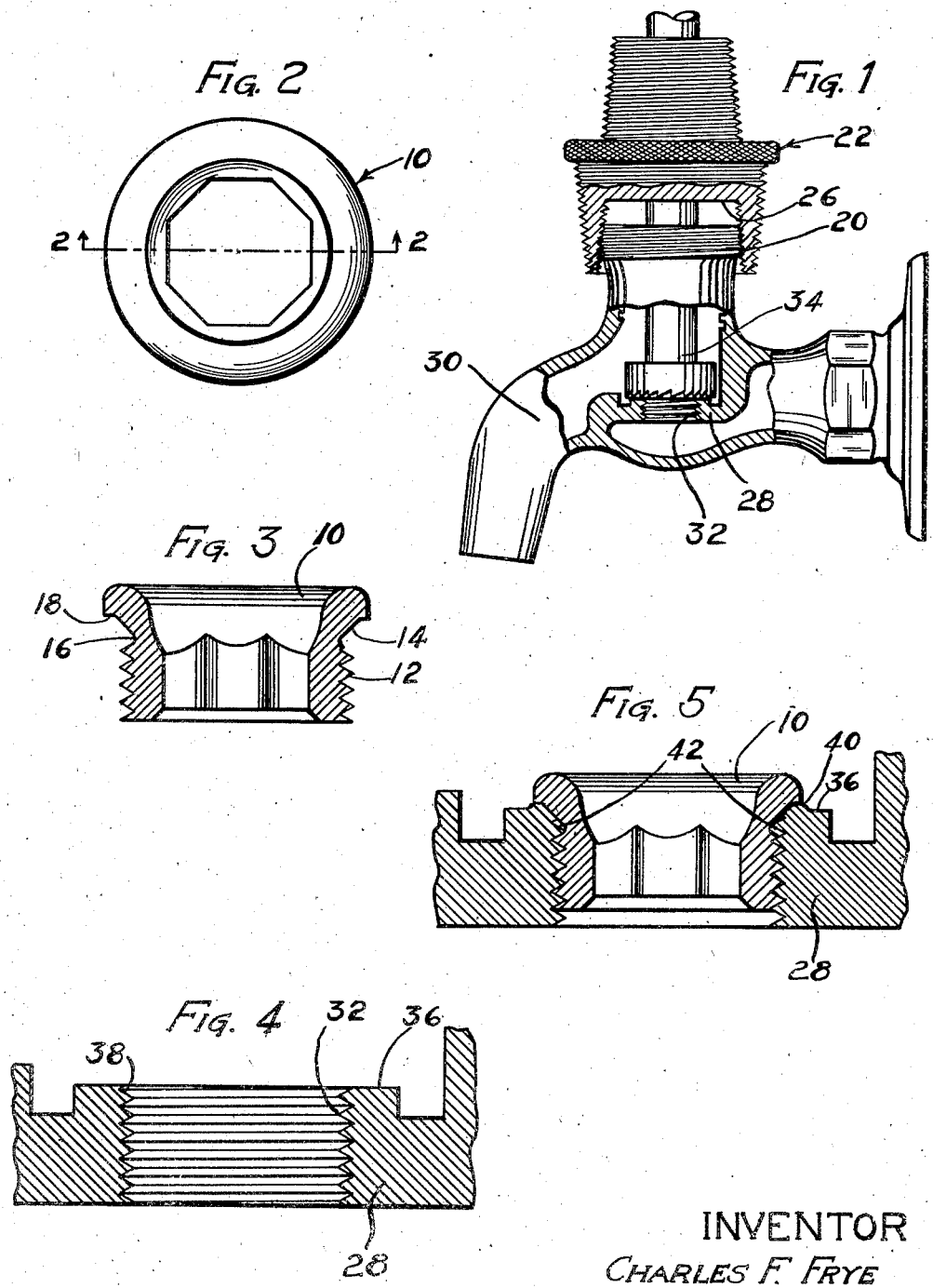

2,104,419

UNITED STATES PATENT OFFICE 2,104,419

VALVE SEAT STRUCTURE

Charles F. Frye, Chicago, Ill.

Application October 29, 1934, Serial No. 750,538

1 Claim. (Cl. 251—167)

My invention relates to plumbing, and more particularly to repair and maintenance work and equipment for repair and maintenance work and includes among its objects and advantages rehabilitation of plumbing fixtures in their normal position of use with approximately the same mechanical efficiency and precision as if they were dismantled and returned to the factory and machine shop.

In the accompanying drawing:

Figure 1 is a side elevation partly in section of an ordinary household valve indicating one of the operations for mounting a new seat therein;

Figure 2 is an enlarged plan view of a replacement seat;

Figure 3 is a section on line 2—2 of Figure 2;

Figure 4 is an enlarged section of the seat supporting portion of the valve body prior to assembly; and Figure 5 is an enlarged section of the valve seat and supporting structure after assembly.

In the embodiment of the invention selected for illustration, I provide a replacement valve seat 10 threaded at 12 and provided with a seating cone 14 spaced from the threaded portion. Below the seating cone 14, the body of the seat member is recessed at 16 to provide clearance for a purpose to be explained hereinafter, and above the cone 14 I provide an abutment shoulder 18.

In reconditioning a valve in which the seat has become too worn for further use, I first remove the usual packing cap or bonnet (not shown) and thread onto the same threads, as at 20 in Figure 1, a jig indicated as a whole by the reference character 22. I first mount in the jig a tap for tapping screw threads and place the jig in the position of Figure 1, after which rotation of the tap will tap screw threads as at 32 in the opening in the diaphragm or base 28.

I then remove the jig and tap and replace the tap with the facing tool 34 indicated in Figure 1 and face the upper surface of the remains of the valve seat as indicated at 36 in Figure 4. This machining generates a sharp edge around the upper end of the opening, and lowers the original seat sufficiently to bring the new seat to the right level.

I then coat the threads 32 and face 36, or the threads 12 and cone 14, or all of the surfaces mentioned, with a thin coating of solid paraffin. The replacement seat of Figure 3 is made of bronze or other suitable material of materially greater hardness and strength than the material of the valve body.

The substitute seat 10 is now forced home to the position of Figure 5. In so doing a substantial amount of material at the edge of the threaded opening as at 38 in Figure 4 is loaded beyond its strength and flows into the upset condition clearly indicated in Figure 5 with the upset metal rising slightly above the level of the face 36 and coming into abutment with the abutment flange 18 at 40. Another portion of the material displaced flows down and partly fills the necked portion 16, but not completely, leaving a slight clearance indicated at 42 in Figure 5. The paraffin on the threads 12 is partly jammed in between the surfaces of the threads 12 and 32 and partly accumulated in the necked portion 16, and after the cone 14 begins to act to upset the metal, this trapped paraffin substantially fills the clearance at 42. After the seat is properly screwed home it is locked against removal.

Thus, in the completed assembly, there is a metal to metal air and water tight seal where the support has been upset, and below that seal the remaining clearance at 42 and any microscopic clearances between the threads 12 and 32 are filled full with tightly compressed solid paraffin, which prevents the entry of any water and substantially eliminates any tendency of the threads to rust.

I find that the paraffin also performs a very advantageous lubricating function during the upsetting action, and prevents any slight lack of perfect polish in the surface of the cone 14 from scoring the upset metal against which it finally comes to rest.

Without further elaboration, the foregoing will so fully explain my invention that others may, by applying knowledge current at the time of application, readily adapt the same for use under various conditions of service.

I claim:

The combination of a valve seat comprising an annular body having an exteriorly threaded portion; a reduced portion at the upper end of said threaded portion; a conical portion above said reduced portion, said conical portion having its larger diameter uppermost, said conical portion extending out to a diameter greater than the maximum diameter of said threads; and an abutment shoulder above said conical portion presenting a surface substantially normal to the axis of said body; with a valve seat support having female threads receiving the male threads on said body, and a flat annular upper surface receiving said shoulder in abutting relation to limit the inward movement of said seat; said support having an annular metal portion adjacent the meeting of said flat annular upper surface and said female screw threads, said annular portion being in an upset condition by reason of displacement by said conical body portion and in direct contact therewith, whereby a complete seal is formed between said conical body portion and said upset annular support portion independently of said threads.

CHARLES F. FRYE.